United States Patent Office 2,718,208
Patented Sept. 20, 1955

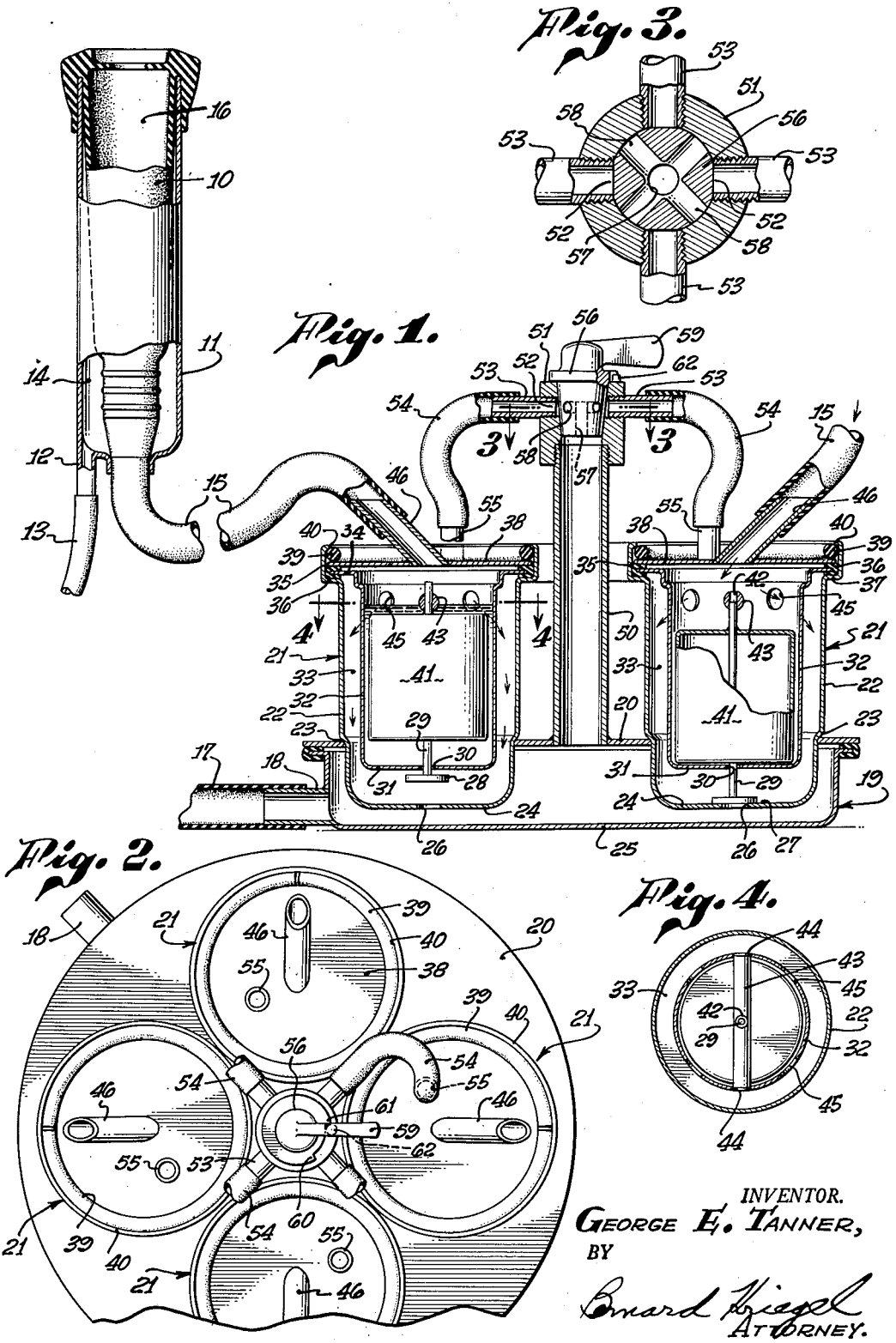

2,718,208

FLUID CONTROLLED VACUUM CUT-OFF FOR MILKING MACHINE TEAT CUPS

George E. Tanner, Bellflower, Calif., assignor, by mesne assignments, to Babson Bros. Co., Chicago, Ill., a corporation of Illinois Application April 29, 1953, Serial No. 351,834

7 Claims. (Cl. 119—14.08)

The present invention relates to milking apparatus, and more particularly to apparatus connectible to the teats of a cow, or corresponding animal, for the purpose of automatically withdrawing milk from the cow's udder.

An object of the present invention is to provide an improved apparatus for milking a cow, or the like, which automatically ceases the milking action when milk is no longer being withdrawn from the cow's teats, thereby avoiding injury to the cow and its ability to give milk.

Another object of the invention is to provide an apparatus for milking a cow, or the like, which discontinues the milking action on each of the cow's teats as it becomes dry, independently of the other teats. The vacuum to which each teat is subjected is shut off automatically when milk is no longer being pulled through the teat.

A further object of the invention is to provide milking apparatus embodying a fluid operated valve mechanism for automatically shutting off the vacuum or negative pressure from each of the cow's teats when milk is no longer being withdrawn therefrom.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a view of a portion of an apparatus embodying the present invention, with parts being disclosed in longitudinal section;

Fig. 2 is a top plan view of the major portion of the apparatus shown in Fig. 1;

Fig. 3 is a cross-section, on an enlarged scale, taken along the line 3—3 on Fig. 1;

Fig. 4 is a cross-section taken along the line 4—4 on Fig. 1.

The apparatus disclosed in the drawings is capable of withdrawing milk by vacuum or negative pressure from the four teats of a cow. Each teat is adapted to be received within an inflation 10, which is usually made of rubber, received and held within a teat cup shell 11. The teat cup shell has a tube 12 leading thereinto connected to flexible tubing 13 running to a suitable pulsator (not shown), which intermittently supplies negative pressure and then air under atmospheric pressure to the annular space 14 in the shell 11 around the inflation 10, to intermittently collapse the inflation for the purpose of shutting off the vacuum action on the cow's teat, and also to massage the latter. Vacuum is continuously being supplied to each inflation 10 through a flexible milk tube 15, while air under atmospheric pressure is intermittently allowed to enter through the line 13 and tube 12 to the teat cup shell 11, for the purpose of collapsing the inflation 10, providing a rest period for a cow's teat within chamber 16.

Although only one set of an inflation 10, teat cup shell 11, tube 12, air line 13 and milk tube 15 is disclosed in Fig. 1, it is to be understood that a set of such apparatus is provided for each of the cow's teats, making a total of four sets.

Continuous vacuum or negative pressure imposed upon each flexible milk tube 15 and inflation 10 is provided from a suitable source (not shown) through a main vacuum line or hose 17 connected to an inlet 18 of a vacuum header and milk receiver 19. The upper portion of this receiver 19 is closed by a closure or cover member 20 suitably connected to the main body of the receiver. Four valve mechanisms 21, for controlling the withdrawal of milk from the cow's teats and the application of vacuum or negative pressure to the inflations 10, communicate with the receiver 19.

As disclosed in the drawings, each of the valve mechanisms 21 includes an outer housing or shell 22 extending through the cover 20 of the receiver 19, there being an intermediate shoulder 23 on the shell seating upon the cover in leakproof relation with respect thereto. The shells may be uniformly disposed about the central vertical axis of the receiver 19. The bottom 24 of each shell 22 is spaced above the bottom 25 of the receiver, being provided with a central outlet or port 26 surrounded by the valve seat portion 27 adapted to be engaged by a valve head 28 secured to a stem 29 extending upwardly through an orifice opening 30 in the bottom 31 of a float chamber 32, the bottom 31 of the chamber being disposed substantially above the bottom 27 of the shell or housing 22. This chamber 32 has a diameter substantially less than the diameter of the housing 22, and extends upwardly therealong to provide an annular space 33 therebetween.

The upper portion of each chamber 32 is constituted by an outwardly directed flange 34 received within a circumferential groove 35 in a non-metallic gasket 36, such as a rubber gasket, adapted to seat upon an outwardly directed shoulder 37 formed at the upper portion of the shell 22. A closure in the form of a lid 38 extends across the upper portion of the shell 22 and is clamped in leakproof relation against the upper side of the gasket 36 by a suitable split snap ring 39 engaging the upper surface of the lid 38 and disposed under an inwardly directed flange or shoulder 40 constituting the terminal portion of the shell 22.

As was stated above, the valve stem 29 extends upwardly through a lower hole, port or orifice 30 in the bottom 31 of the float chamber 32, the orifice being provided by the annular clearance space allowed between the exterior of the stem and the bottom portion of the chamber defining the port 30. This stem 29 is connected to a float member 41, which is buoyant in liquids, such as milk, the stem extending in leakproof relation to the float member completely through the latter and projecting upwardly from its upper end through a suitable hole 42 in a guide pin or rod 43 extending transversely across the upper portion of the chamber 32, its ends being received and retained within diametrically opposed holes 44 in the chamber. As the float 41 rises and falls, depending upon the liquid level in the chamber 32, the stem 29 slides through the guiding hole 42 in the transverse rod 43 in a free manner, to elevate or lower the valve head 28 with respect to the valve seat 27.

The upper portion of each float chamber 32 has a plurality of ports or holes 45 therethrough, through which milk can overflow into the annulus 33 between the chamber 32 and the valve housing 22, this milk then flowing outwardly through the port 26 in the bottom of the shell 22 into the receiver 19, from which it is withdrawn through the vacuum line or hose 17.

Each of the flexible milk tubes 15 is connected to one of the valve mechanisms 21. The end of the milk tube, remote from the inflation 10, is disposed in leakproof relation over an inlet or nipple 46 extending from the lid 38 of the valve housing and communicating with the interior of the latter. When the valve head 28 is elevated above its companion seat 27, the vacuum is applied to the flexible milk tube 15 and the inflation 10, to draw the milk from the cow's teat, the milk flowing through the milk tube 15 and nipple 46 into the float chamber 32, and then passing downwardly through the orifice 30 in the bottom 31 of the chamber. When the chamber 32 is substantially filled, the milk overflows through the side ports 45 into the annulus 33 around the chamber, the milk in the annulus combining with the milk passing through the orifice 30 for passage down through the outlet port 26 in the bottom of the housing 22 into the receiver 19, from which it is withdrawn through the vacuum line or hole 17. When substantially no milk is present in the float chamber 32, the float 41 has been lowered by gravity until the head 28 attached to the valve stem 29 engages the seat 27, closing the outlet port 26 and preventing the vacuum or negative pressure in the line or hose 17 and receiver 19 from being imposed upon the valve housing 22, chamber 32, inlet tube or claw 46, flexible milk tube 15 and inflation 10.

At the commencement of the milking operation on the cow, all of the float chambers 32 are dry, the floats 41 being in their lower position with the valve heads 28 connected thereto engaging their seats 27. Accordingly, no vacuum can be applied to any of the inflations 10 for the purpose of withdrawing milk through the cow's teats. Accordingly, operation of the apparatus is instituted by the initial application of vacuum through another device that by-passes the float operated valves 21. As disclosed in the drawings, a central starting vacuum tube 50 is suitably secured to the cover 20 of the receiver 19, its lower end communicating with the exterior of the latter. A valve body 51 is attached, as by threading, to the upper end of this tube 50. This valve body has four radial ports 52, each port communicating with a vacuum nipple 53 attached to the body and received within the end of an auxiliary vacuum tube 54, the other end of which is attached to an auxiliary vacuum inlet 55 secured to the lid or closure 38 and opening into the valve housing 22 and valve chamber 32. The radial ports 52 in the valve body 51 are open or closed, depending upon the position of a rotary valve head 56 rotatably mounted within the valve body 51. This head has a central axial passage 57 communicating with the starting vacuum tube 50 and also four ports 58 radiating from the central passage, which are adapted to be placed into or out of communication with the body ports 52.

The valve head 56 may be rotated by a suitable handle 59 secured to its upper end, the rotation of the head preferably being limited to substantially forty-five degrees by engagement of stop shoulders 60, 61 formed thereon with a stop pin 62 secured to and extending upwardly from the valve body 51. When the handle 59 is manipulated, to turn the head 56 until one of the shoulders 61 engages the stop pin 62, the ports 58 are all completely out of alignment with the body ports 52, the valve then being in closed position and the vacuum in the central tube 50 being prevented from being applied to the auxiliary tubes 54. However, when the handle 59 is rotated approximately forty-five degrees, until the other stop shoulder 60 on the head engages the stop pin 62, all of the side ports 58 of the valve head are in alignment with the valve body ports 52 and nipples 53, the vacuum then being imposed on all of the auxiliary tubes 54 and vacuum inlets 55, to withdraw the milk by vacuum from all of the inflations 10, flexible milk tubes 15 and inlet claws 46, the milk dropping from the claws 46 into the float chambers 32.

Since the milk in each float chamber 32 can pass outwardly through its bottom choke orifice 30 at only a comparatively slow rate, because of the restricted area of the orifice, the level of milk in each float chamber will rise, the float 41 rising with the increase in the milk level to elevate the valve head 28 from its companion valve seat 27 to open the port 26 and thereby place the interior of each valve housing 22 and float chamber 32 in direct communication with the vacuum in the header or reservoir 19. When all of the floats 41 have risen, to remove the valve heads 28 connected thereto from their companion seats 27, the handle 59 can be turned to close the auxiliary vacuum valve by disaligning the ports 58 and 52, since the auxiliary by-passing vacuum device is no longer needed.

The vacuum is being applied continuously through each valve mechanism 21 to the flexible milk tubes 15 and inflations 10, the pulsator (not shown) automatically constricting and releasing the inflation 10, to massage the cow's teats and open and close the inflation to the action of vacuum within the flexible milk tube 15. The milk will flow through each tube 15 and the nipple 46 into the chamber 32. When the level of milk in the chamber rises to the position of the side ports 45, the additional milk will then pass outwardly through these ports into the annulus 33 around the chamber, being withdrawn through the outlet port 26 into the receiver 19, and from the receiver through the vacuum line or hose 17. The valve head 28 will remain above its companion seat 27, so long as milk is being withdrawn from the cow's teat.

When the withdrawal of milk from the cow's teat ceases, the vacuum is no longer capable of pulling milk into the chamber 32. Accordingly, the level of milk in the chamber will drop, the milk flowing out through the orifice 30. When the level drops sufficiently, the float 41 will descend and engage the valve head 28 with its seat 27, thereby discontinuing the application of vacuum from the receiver 19 and vacuum hose 17 to the valve housing 22, which will, of course, discontinue the application of vacuum to the inlet tube 46, flexible milk tube 15 and inflation 10. As stated above, the starting vacuum valve 51, 56 has previously been moved to closed position once the float operated valves 21 were opened.

The floats 41 will lower, to interrupt the application of vacuum to the inflations 10 individually. Accordingly, the application of vacuum to each inflation and the cow's teat will be interrupted or discontinued as each teat becomes dry, and independently of the fact that the milk may or may not still be flowing from another teat. Because of such interruption of the vacuum, possible injury to the cow is prevented, since the continued application of the vacuum to the interior 16 of the inflation 10 after a teat becomes dry can and has had very deleterious effects up the cow. Is has previously been necessary for the operator of the milking apparatus to watch each cow carefully, to manually discontinue the application of vacuum. In the present instance, the application of vacuum is discontinued automatically very soon after the cow's teat becomes dry, the elapsed time being measured in seconds and only being limited by the time it takes for the relatively small quantity of milk in the float chamber 32 to drain out of the chamber through the orifice 30.

The inventor claims:

1. In milking apparatus: a milk receiver having a bottom; a vacuum line connected to said receiver; a plurality of individual passage means adapted to be placed individually in communication with a cow's teats and through which milk from said teats can flow; an individual housing communicating with each of said passage means and extending into said receiver, said housing having an outlet in said receiver spaced above said receiver bottom; a chamber in each of said housings and having a flow restricting orifice through which milk can flow into said housing; a valve member for selectively opening or closing each of said outlets; a float member buoyant in milk in each of said chambers and operatively connected to the valve member that controls the outlet of the housing in which said chamber is contained to open said outlet when said float member has been elevated by milk in said chamber and to close said outlet when said float member has been lowered in said chamber; a common vacuum line opening into said receiver; a conduit extending between said common vacuum line and each of said housings; and a valve connected to said common vacuum line and operable to selectively establish communication between said common vacuum line and said conduits or to prevent such communication.

2. In milking apparatus: conduit means adapted to establish communication between a cow's teat and a source of vacuum; a valve in said conduit means, adjacent said teat, and responsive to milk therein to open said conduit in the presence of milk therein and to close the conduit in the absence of milk therein; and a valve-controlled conduit means by-passing said milk responsive valve, whereby when said milk responsive valve is closed, the valve in said by-pass conduit may be opened to apply vacuum to the cow's teat to start the flow of milk.

3. In milking apparatus: a plurality of conduit means adapted to establish communication between a cow's teats and a source of vacuum; a plurality of valves in said conduit means, adjacent said teats, and responsive to milk therein to open each conduit in the presence of milk therein and to close each conduit in the absence of milk therein; and conduit means by-passing said valves and controlled by a single valve therein whereby when said milk responsive valves are closed, the valve in said by-pass conduit means may be opened to apply vacuum to the cow's teats to start the flow of milk.

4. Apparatus of the character described in claim 2, wherein said by-pass conduit means are external of the milk contacted portions of the first mentioned conduit means whereby no milk flows through the by-pass conduit.

5. Apparatus of the character described in claim 2, wherein the milk responsive valve is in a chamber provided in the first mentioned conduit means and the by-pass conduit valve is external of the first mentioned conduit and said chamber whereby no milk flows through the by-pass valve.

6. Apparatus of the character described in claim 3, wherein a common vacuum line is connected to a source of vacuum, a plurality of vacuum by-pass conduits extend between the common vacuum line and the first mentioned conduit means, and a single valve is provided in the common vacuum line and operable to establish communication between the source of vacuum and the first mentioned conduit means to start the flow of milk.

7. In milking apparatus: conduit means adapted to be connected to a cow's teat and through which milk can flow; a housing having an outlet for communication with a source of vacuum; a chamber having an inlet connected with said conduit means and a flow restricting outlet orifice through which milk can flow into said housing; a valve in said chamber for selectively opening or closing the outlet; a float member buoyant in milk with said chamber and connected to said valve member to open the outlet when the float member is elevated by milk in the chamber and to colse the outlet in the absence of milk in the chamber; and valve controlled conduit means by-passing said float-controlled valve whereby when said float-operated valve is closed, the valve in said by-pass conduit may be opened to apply vacuum to the cow's teat to start the flow of milk.

References Cited in the file of this patent

UNITED STATES PATENTS

| | | |
|---|---|---|
| 854,643 | Hartnett et al. | May 21, 1907 |
| 1,109,800 | Sorensen | Sept. 8, 1914 |
| 1,193,402 | Laughlin | Aug. 1, 1916 |
| 1,276,803 | Paarmann | Aug. 27, 1918 |
| 2,466,841 | Eades | Apr. 12, 1949 |
| 2,685,862 | Hill et al. | Aug. 10, 1954 |